US011775219B2

(12) United States Patent
Liu et al.

(10) Patent No.: US 11,775,219 B2
(45) Date of Patent: Oct. 3, 2023

(54) ACCESS CONTROL STRUCTURE FOR SHARED MEMORY

(71) Applicant: Hewlett-Packard Development Company, L.P., Spring, TX (US)

(72) Inventors: Wei Ze Liu, Spring, TX (US); Khoa Dang Huynh, Houston, TX (US); Rosilet Retnamoni Braduke, Cypress, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 85 days.

(21) Appl. No.: 17/576,251

(22) Filed: Jan. 14, 2022

(65) Prior Publication Data
US 2023/0229351 A1 Jul. 20, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0632* (2013.01); *G06F 3/0656* (2013.01); *G06F 3/0679* (2013.01)
(58) Field of Classification Search
CPC .... G06F 3/0659; G06F 3/0604; G06F 3/0632; G06F 3/0656
See application file for complete search history.

(56) References Cited

U.S. PATENT DOCUMENTS

| 5,819,087 A | 10/1998 | Le |
| 7,058,777 B2 | 6/2006 | Chang |
| 7,516,260 B2 | 4/2009 | Yu |
| 8,291,211 B2 | 10/2012 | Choi |
| 2014/0325200 A1* | 10/2014 | Nitta ...................... G06F 12/14 711/152 |

OTHER PUBLICATIONS

Giovino, Bill, "Why and How to Expand Microcontroller Program Memory with SIP XiP Flash", May 8, 2019, https://www.digikey.com/en/articles/why-and-how-to-expand-microcontroller-program-memory-with-spi-xip-flash (Year: 2008).*

* cited by examiner

*Primary Examiner* — Edward J Dudek, Jr.
(74) *Attorney, Agent, or Firm* — Knobbe, Martens, Olson & Bear, LLP

(57) ABSTRACT

Examples of electronic devices are described herein. In some examples, an electronic device includes a flash memory. In some examples, the electronic device includes a host memory to store an access control structure to access the flash memory. In some examples, the electronic device includes a first circuitry coupled to the host memory and the flash memory. In some examples, the first circuitry is to read the access control structure in the host memory to determine when to access the flash memory.

12 Claims, 5 Drawing Sheets

ACCESS CONTROL STRUCTURE FOR SHARED MEMORY

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
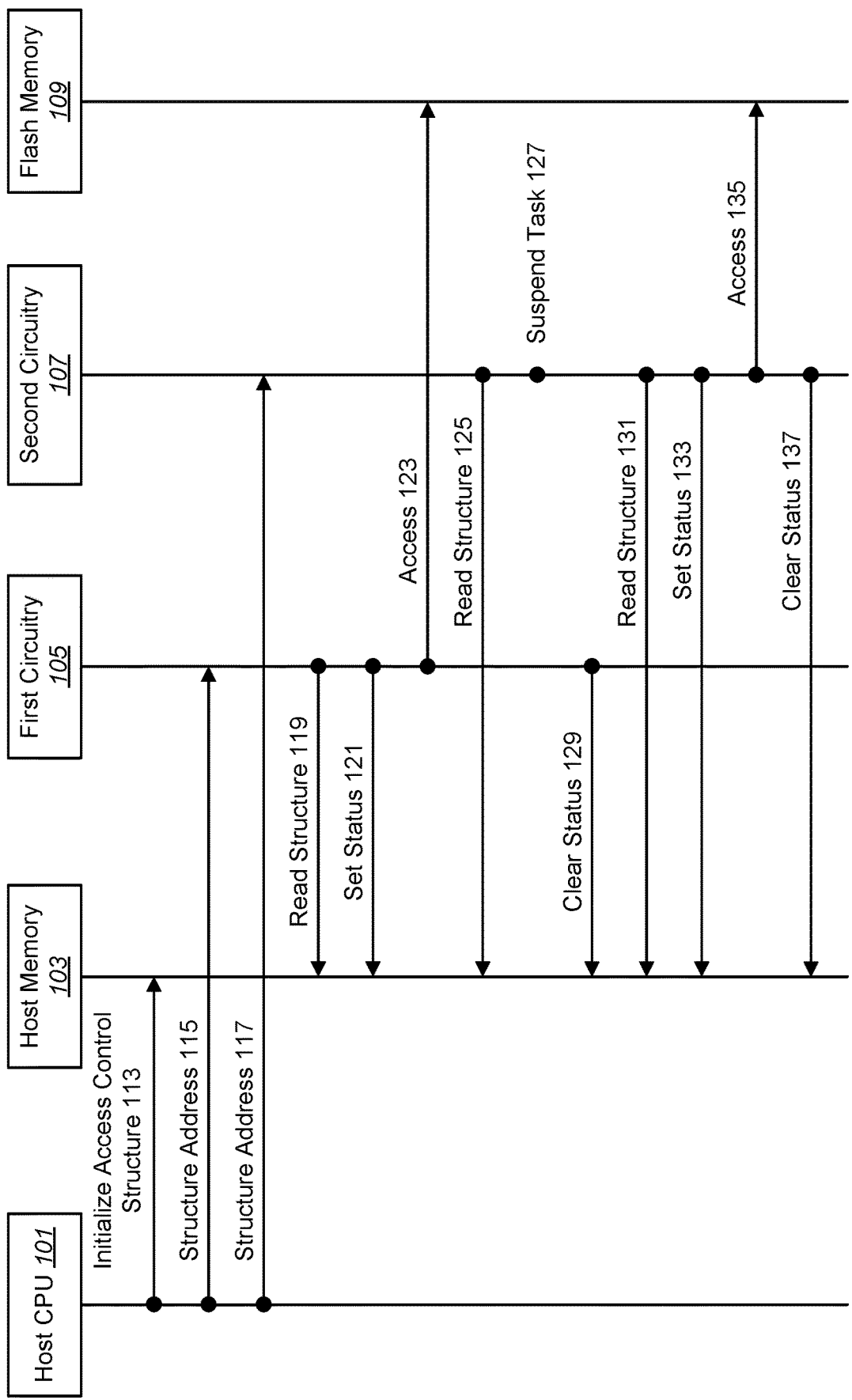
FIG. 1 is a thread diagram illustrating an example of memory accesses in accordance with some examples of the techniques described herein.

In some electronic devices (e.g., computing devices), flash memory, a bus, or a combination thereof may be shared by multiple circuitries (e.g., logic circuit(s), processor(s), controller(s), engine(s), etc.) to reduce cost. Examples of circuitries may include a host central processing unit (CPU), an embedded controller, a management engine, and a network controller, etc. In some examples, a bus (e.g., serial peripheral interface (SPI) bus, enhanced SPI (eSPI) bus, etc.) that connects the circuitries to the flash memory may have an arbitration procedure to avoid command collisions between the circuitries. The arbitration procedure may allow commands on a first come first served basis and may be executed once the flash memory is not busy (e.g., is free). Some commands, such as an erase command or a program command, may consume a relatively significant amount of time.

In some cases, a command or access to the flash memory from a circuitry (e.g., processor, controller, etc.) may be significantly delayed (e.g., may take more time than expected) due to another circuitry or circuitries accessing the flash memory, the bus, or a combination thereof concurrently. A priority task may be negatively impacted, which may result in decreased performance or a poor user experience. In some approaches for a basic input/output system (BIOS) update, issues may occur. For example, if there is a Windows Management Instrumentation (WMI) call during the firmware update, the System Management Interrupt (SMI) generated by the WMI to access a variable on the shared flash memory may take significantly longer due to shared flash memory (e.g., bus) access from an embedded controller. The SMI latency may impact operating system (OS) performance (e.g., audio glitch, mouse lag, etc.) or user experience. The BIOS update to the shared flash memory (via SPI bus, for instance) by the embedded controller may be significantly slower due to increased WMI activities.

Some examples of the techniques described herein may provide a protocol(s) for circuitries (e.g., processor(s), controller(s), engine(s), or a combination thereof) to communicate with each other. In some examples, a data structure is allocated in memory (e.g., Unified Extensible Firmware Interface (UEFI) reserved memory) and initialized by a BIOS (e.g., UEFI BIOS). In some examples, the data structure may be accessed via Direct Memory Access (DMA) over a bus (e.g., eSPI bus) by the circuitries. In some examples, the BIOS may initialize the data structure. The BIOS may indicate an address of the data structure to other circuitries (after initialization, for instance). When a circuitry is to access the flash memory, the bus, or a combination thereof, the circuitry may read the data structure. If a flag in the data structure indicates that the flash memory, the bus, or a combination thereof is busy (e.g., occupied, unavailable, currently performing a task, etc.), the circuitry may suspend a current task (e.g., thread). If the flag indicates that the flash memory, the bus, or a combination thereof is available (e.g., clear, not busy, etc.), the circuitry may set the flag to busy and may start one or multiple commands (e.g., SPI commands). If suspended, the task (e.g., thread) may resume after a period. A quantity of commands (e.g., SPI commands), a suspend time, or a combination thereof may be adjusted such that a higher priority task may be given a longer time to access the flash memory, the bus, or a combination thereof. In some examples, priority may be determined on a case by case basis based on the task. In some examples, priority may be set at a level (e.g., device level, system level, etc.) where information is available regarding the tasks on each component (e.g., processor, controller, device, engine, etc.). In some examples, a higher priority task may be allowed to send more commands (e.g., SPI commands), may have shorter length of suspend time, or a combination thereof. In some examples of the techniques described herein, each circuitry may communicate with another circuitry regarding shared flash memory access, bus access, or a combination thereof, which may allow access for a high priority task(s). Some examples of the techniques described herein may enhance shared flash memory performance (e.g., may reduce latency, may reduce negative impacts on the user experience, etc.) while maintaining lower costs by sharing flash memory.

An electronic device may be a device that includes electronic circuitry (e.g., integrated circuitry). A computing device may be an electronic device that includes a processor, logic circuitry, or a combination thereof. Examples of computing devices may include desktop computers, laptop computers, tablet devices, smartphones, televisions, game consoles, smart speakers, voice assistants, Internet of Things (IoT) devices, etc. A computing device may utilize processor(s) or logic circuitry to perform an operation or operations. In some examples, computing devices may execute instructions stored in memory to perform the operation(s). Instructions may be code or programming that specifies functionality or an operation of a processor or logic circuitry. In some examples, instructions may be stored in non-volatile memory (e.g., Read-Only Memory (ROM), Erasable Programmable Read-Only Memory (EPROM), Electrically Erasable Programmable Read-Only Memory (EEPROM), flash memory, etc.). In some examples, different memories (e.g., flash memories) in an electronic device may store separate instructions for different circuitries.

Throughout the drawings, similar reference numbers may designate similar or identical elements. When an element is referred to without a reference number, this may refer to the element generally, without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

FIG. 1 is a thread diagram illustrating an example of memory accesses in accordance with some examples of the techniques described herein. FIG. 1 illustrates examples of a host CPU 101, a host memory 103, a first circuitry 105, a second circuitry 107, and a flash memory 109. In some examples, the host memory 103, the first circuitry 105, and the flash memory 109 may be respective examples of the host memory 204, the first circuitry 206, and the flash memory 208 described in FIG. 2. In some examples, portions of the electronic device 202 may be coupled via an interface (e.g., bus(es), wire(s), connector(s), etc.). As used herein, the term "couple" or "coupled" may denote a direct connection (without an intervening component) or an indirect connection (with an intervening component(s)). In some examples, the host CPU 101, the first circuitry 105, and the second circuitry 107 may be coupled to the host memory 103 and to the flash memory 109 via a bus (e.g., SPI bus). In some examples, the host CPU 101, host memory 103, first circuitry 105, second circuitry 107, and flash memory 109 may be components of an apparatus, electronic device (e.g., electronic device 202), or computing device (e.g., computing device 338).

As used herein, a basic input/output system (BIOS) refers to hardware or hardware and instructions to initialize, control, or operate a device (e.g., computing device 338, electronic device 202, etc.) prior to execution of an operating system (OS) of the device. Instructions included within a BIOS may be software, firmware, microcode, or other programming that defines or controls functionality or operation of a BIOS. In one example, a BIOS may be implemented using instructions, such as platform firmware of a device, executable by a processor. In some examples, the host CPU 101 may execute BIOS instructions to perform an operation or operations described herein. In some examples, BIOS instructions may be stored in the flash memory 109 and executed by the host CPU 101 to perform a BIOS operation. A BIOS may operate or execute prior to the execution of the OS of a device. A BIOS may initialize, control, or operate components such as hardware components of a device and may load or boot the OS of a device.

In some examples, a BIOS may provide or establish an interface between hardware devices or platform firmware of the device and an OS of the device, via which the OS of the device may control or operate hardware devices or platform firmware of the device. In some examples, a BIOS may implement the Unified Extensible Firmware Interface (UEFI) specification or another specification or standard for initializing, controlling, or operating a device.

The host memory 103 is an electronic, magnetic, optical, other physical storage device, or a combination thereof that contains or stores electronic data (e.g., information, instructions, or a combination thereof). The host memory 103 may be, for example, Random Access Memory (RAM), Electrically Erasable Programmable Read-Only Memory (EEPROM), a storage device, an optical disc, the like, or a combination thereof. In some examples, the host memory 103 may be volatile or non-volatile memory, such as Dynamic Random Access Memory (DRAM), EEPROM, magnetoresistive random-access memory (MRAM), phase change RAM (PCRAM), Synchronous Dynamic Random Access Memory (SDRAM), Double Data Rate (DDR) RAM, memristor, flash memory, the like, or a combination thereof. In some examples, the host memory 103 may be a non-transitory tangible machine-readable storage medium, where the term "non-transitory" does not encompass transitory propagating signals. In some examples, the host memory 103 may include multiple devices (e.g., a RAM card and a solid-state drive (SSD)). In some examples, the host memory 103 may be associated with the host CPU 101 of an electronic device. In some examples, the host memory 103 may have a largest storage capacity of volatile memory devices of an electronic device (e.g., computing device). In some examples, the host memory 103 may be host RAM of an electronic device. In some examples, the host memory 103 may be coupled to a motherboard of an electronic device (via RAM slot(s), for instance). In some examples, a host CPU may be a largest processor, a processor capable of performing a largest quantity of logic operations (e.g., greatest operation throughput), or a combination thereof on an electronic device (e.g., computing device).

At 113, the host CPU 101 (e.g., host CPU 101 executing BIOS instructions) may initialize an access control structure in host memory 103. An access control structure is a data structure to control access to a component (e.g., flash memory 109), a bus, or a combination thereof. For example, the access control structure may include data indicating a status of a component, a bus, or a combination thereof (e.g., whether a component or a bus is busy or clear). In some examples, the host CPU 101 may write the access control structure to host memory 103. In some examples, when the access control structure is initialized, the host CPU 101 may set a status to clear, indicating that the flash memory 109 is available to be accessed.

At 115, the host CPU 101 (e.g., host CPU 101 executing BIOS instructions) may indicate an access control structure address to first circuitry 105. For instance, the host CPU 101 may send information (e.g., pointer, memory offset, index, etc.) indicating an address of the access control structure in host memory 103 to the first circuitry 105. The first circuitry 105 may be a logic circuit, processor, CPU, controller, engine, etc.

At 117, the host CPU 101 (e.g., host CPU 101 executing BIOS instructions) may indicate an access control structure address to second circuitry 107. For instance, the host CPU 101 may send information (e.g., pointer, memory offset, etc.) indicating an address of the access control structure in host memory 103 to the second circuitry 107. The second circuitry 107 may be a logic circuit, processor, controller, engine, etc.

At 119, the first circuitry 105 may read the access control structure in host memory 103. For instance, when the first circuitry 105 executes a task to access the flash memory 109, the first circuitry 105 may read the access control structure in host memory 103 (based on the address provided by the host CPU 101, for instance) to determine whether the flash memory 109 status is busy or clear. In this example, the flash memory 109 status is clear. At 121, the first circuitry 105 may set the status to busy. For instance, the first circuitry 105 may write an indicator (e.g., bit value, character, string, etc.) of the busy status in the access control structure in host memory 103. At 123, the first circuitry 105 may access the flash memory 109. For instance, the first circuitry 105 may execute a command(s) to read data from the flash memory 109, to write data to the flash memory 109, or a combination thereof.

At 125, the second circuitry 107 may read the access control structure in host memory 103. For instance, when the second circuitry 107 executes a task to access the flash memory 109, the second circuitry 107 may read the access control structure in host memory 103 (based on the address provided by the host CPU 101, for instance) to determine whether the flash memory 109 status is busy or clear. In this example, the status read by the second circuitry 107 is initially busy (due to the status written by the first circuitry 105). At 127, the second circuitry 107 suspends the task. For instance, the second circuitry 107 may delay further execution of the task for a period.

At 129, the first circuitry 105 clears the status in host memory 103. For instance, when the first circuitry 105 has completed accessing the flash memory 109, the first circuitry 105 may write an indicator (e.g., bit value, character, string, etc.) of the clear status in the access control structure in host memory 103.

At 131, the second circuitry 107 may read the access control structure in host memory 103. For instance, when the second circuitry 107 resumes the task to access the flash memory 109, the second circuitry 107 may read the access control structure in host memory 103 (based on the address provided by the host CPU 101, for instance) to determine whether the flash memory 109 status is busy or clear. In this example, the flash memory 109 status is now clear (after access is completed by the first circuitry 105). At 133, the second circuitry 107 may set the status to busy. For instance, the second circuitry 107 may write an indicator (e.g., bit value, character, string, etc.) of the busy status in the access control structure in host memory 103. At 135, the second circuitry 107 may access the flash memory 109. For instance, the second circuitry 107 may execute a command(s) to read data from the flash memory 109, to write data to the flash memory 109, or a combination thereof.

At 137, the second circuitry 107 clears the status in host memory 103. For instance, when the second circuitry 107 has completed accessing the flash memory 109, the second circuitry 107 may write an indicator (e.g., bit value, character, string, etc.) of the clear status in the access control structure in host memory 103.

FIG. 1 provides an example of controlling access to the flash memory 109 in accordance with some of the techniques described herein. For instance, the first circuitry 105 and the second circuitry 107 may utilize the access control structure in host memory 103 to coordinate access to the flash memory 109. While the example of FIG. 1 illustrates a first circuitry 105 and a second circuitry 107, other quantities of circuitries may be utilized in some examples of the techniques described herein.

Figure 2:
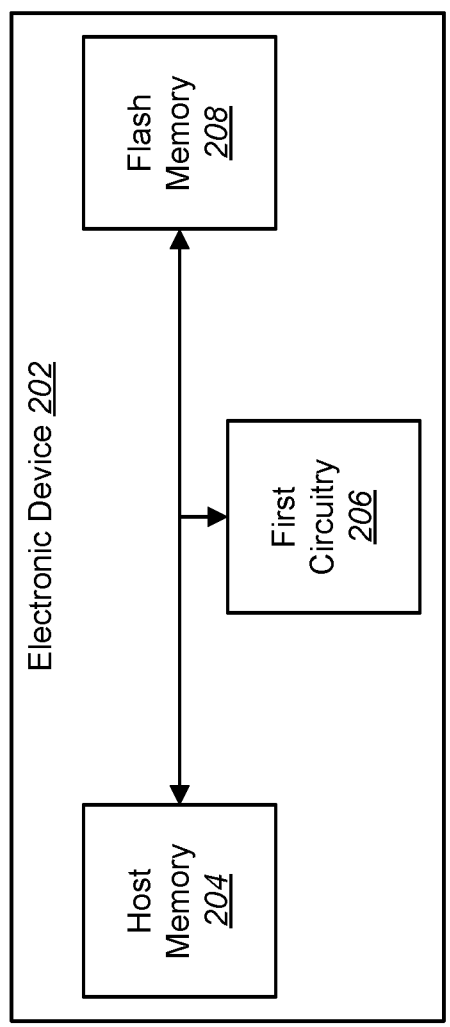
FIG. 2 is a block diagram illustrating an example of an electronic device that may be used to control memory access.

FIG. 2 is a block diagram illustrating an example of an electronic device 202 that may be used to control memory access. Examples of the electronic device 202 may include a computer (e.g., desktop computer, laptop computer, etc.), a smartphone, a tablet computer, a game console, etc. The electronic device 202 may include a host memory 204, first circuitry 206, and a flash memory 208. In some examples, the electronic device 202 may include a CPU (e.g., host CPU). The CPU may be a processor to perform an operation on the electronic device 202. Examples of the CPU may include a general-purpose processor, a microprocessor, etc. In some examples, the CPU may be an application processor. In some examples, the CPU may execute instructions (e.g., an application) on the electronic device 202.

The host memory 204 is an electronic, magnetic, optical, other physical storage device, or a combination thereof that contains or stores electronic data (e.g., information and instructions). The host memory 204 may be, for example, RAM, EEPROM, a storage device, an optical disc, the like, or a combination thereof. In some examples, the host memory 204 may be volatile or non-volatile memory, such as DRAM, EEPROM, MRAM, PCRAM, SDRAM, DDR RAM, memristor, flash memory, the like, or a combination thereof. In some examples, the host memory 204 may be a non-transitory tangible machine-readable storage medium. In some examples, the host memory 204 may include multiple devices (e.g., a RAM card and an SSD). In some examples, the host memory 204 may be associated with a CPU of the electronic device 202. For instance, the host memory 204 may store instructions for execution by the CPU. In some examples, the host memory 204 may be separate from the flash memory 208. In some examples, the host memory 204 may have a larger storage capacity than the flash memory 208. In some examples, the host memory 204 may be host RAM of the electronic device 202. In some examples, the host memory 204 may be coupled to a motherboard of the electronic device 202 (via RAM slot(s), for instance).

The first circuitry 206 may be a logic circuit. For instance, the first circuitry 206 may be a logic circuit capable of performing logical operations. Examples of the first circuitry 206 may include a processor, field-programmable gate array (FPGA), application-specific integrated circuit (ASIC), CPU, controller, engine, etc. For instance, the first circuitry 206 may be a CPU or another processor, controller, or engine. In some examples, the first circuitry 206 may be coupled to a processor socket of a motherboard (not shown in FIG. 2) of the electronic device 202. In some examples, the first circuitry 206 may be attached (e.g., soldered) to a motherboard of the electronic device 202.

The flash memory 208 is non-volatile memory circuitry. For example, the flash memory 208 may be NAND flash memory or NOR flash memory. In some examples, the flash memory 208 may be attached (e.g., soldered) to a motherboard of the electronic device 202. In some examples, the flash memory 208 may store firmware (e.g., firmware executable by a BIOS to boot the electronic device 202).

The first circuitry 206 may be coupled to the host memory 204 and to the flash memory 208. For instance, the first circuitry 206 may be coupled to the host memory 204 and the flash memory 208 with an interface, wire, bus, or a combination thereof. In some examples, the first circuitry 206 may be coupled to the host memory 204 and to the flash memory 208 with a serial peripheral interface (e.g., SPI or eSPI) bus. For instance, the electronic device 202 may include a serial peripheral interface bus, where the first circuitry 206 may read the host memory 204 via the serial peripheral interface bus, may access the flash memory 208 via the serial peripheral interface bus, or may perform a combination thereof.

In some examples, the host memory 204 stores an access control structure to access the flash memory 208. In some examples, the electronic device 202 includes a BIOS (not shown in FIG. 2) to initialize the access control structure in the host memory 204. For instance, the access control structure may be initialized (e.g., initially written) by a BIOS (e.g., host CPU) of the electronic device 202. In some examples, the access control structure may be stored in reserved memory (e.g., UEFI reserved memory). Reserved memory is a portion of host memory 204. For instance, reserved memory may be a portion of the host memory 204 reserved for use by a BIOS. In some examples, the BIOS may send an address indication to the first circuitry 206. For instance, the BIOS (e.g., host CPU) may send an address of the access control structure in the host memory 204 to the first circuitry 206. In some examples, the BIOS may send the address indicator when the BIOS initializes the access control structure or after the BIOS completes initializing the access control structure (e.g., after boot).

In some examples, the access control structure includes a status (e.g., status "flag" or indicator), a component quantity, a set of addresses for component blocks, a component identifier(s), a request pending indicator(s), an in-progress indicator(s), or a combination thereof. The status (e.g., flag) may indicate a status of the flash memory 208, a bus to access the flash memory, or a combination thereof. In some examples, the access control structure may include a header. The header may include a header size parameter, the status, the quantity of components, the set of component addresses, or a combination thereof. The header size parameter may indicate a data size of the header (in bits or bytes, etc.).

The component quantity may indicate a quantity of components (e.g., circuitries, processors, controllers, engines, etc.) that may access the flash memory 208 (e.g., that are coupled to a bus, that may execute read or write operations with the flash memory 208, or a combination thereof). Some examples of components (e.g., circuitries) may include a CPU, embedded controller, management engine, network interface card (NIC) controller, etc. For instance, the first circuitry 206 and other circuitries may be included in the component quantity.

The set of addresses for component blocks may indicate addresses (e.g., pointers, offsets, indexes, etc.) of blocks (in the host memory 204, in the access control structure, or a combination thereof), where each component block includes data corresponding to a component (e.g., circuitry, processor, controller, engine, etc.). In some examples, a component block in the access control structure may include a component identifier, a request pending indicator, an in-progress indicator, or a combination thereof.

In some examples, a component identifier is data (e.g., a string, number(s), character(s), etc.) to identify a component. In some examples, a request pending indicator is data indicating whether a component has a request pending (e.g., a request pending to access the flash memory 208, a bus, or a combination thereof). In some examples, an in-progress indicator is data indicating whether a component has a task in-progress (e.g., indicating whether a component is currently executing a task).

In some examples, the first circuitry 206 may read the access control structure in the host memory 204 to determine when to access the flash memory 208. In some examples, the first circuitry 206 may read the access control structure in the host memory 204 via direct memory access. For instance, the first circuitry 206 may read the access control structure from the host memory 204 independently of a host CPU (e.g., without host CPU intervention).

In some examples, the first circuitry 206 may read a status in the access control structure to determine when to access the flash memory 208. For instance, the first circuitry 206 may read the status to determine whether the status indicates a busy status or a clear status for the flash memory 208, a bus, or a combination thereof. In some examples, the first circuitry 206 may set the status as busy in response to a determination that the status is clear, and may access the flash memory 208. For instance, when the status is clear, the first circuitry 206 may proceed to set the status as busy and access the flash memory 208. Setting the status as busy may indicate to another circuitry that the flash memory 208 is currently busy.

In some examples, the first circuitry 206 may suspend a task in response to a determination that the status is busy, and may resume the task after a period. For instance, the status may have been set to busy by a second circuitry (not shown in FIG. 2) included in the electronic device 202. Accordingly, the first circuitry 206 may suspend a task (e.g., a task to access the flash memory 208, a bus, or a combination thereof) and may read the status again after a period (e.g., a suspend period, a sleep period). If the status is clear, the first circuitry 206 may continue the task.

In some examples, the electronic device 202 may perform one, some, or all of the aspects, operations, elements, etc., described in one, some, or all of FIG. 1-5. In some examples, the electronic device 202 may include an element described in one, some, or all of FIG. 1-5.

Figure 3:
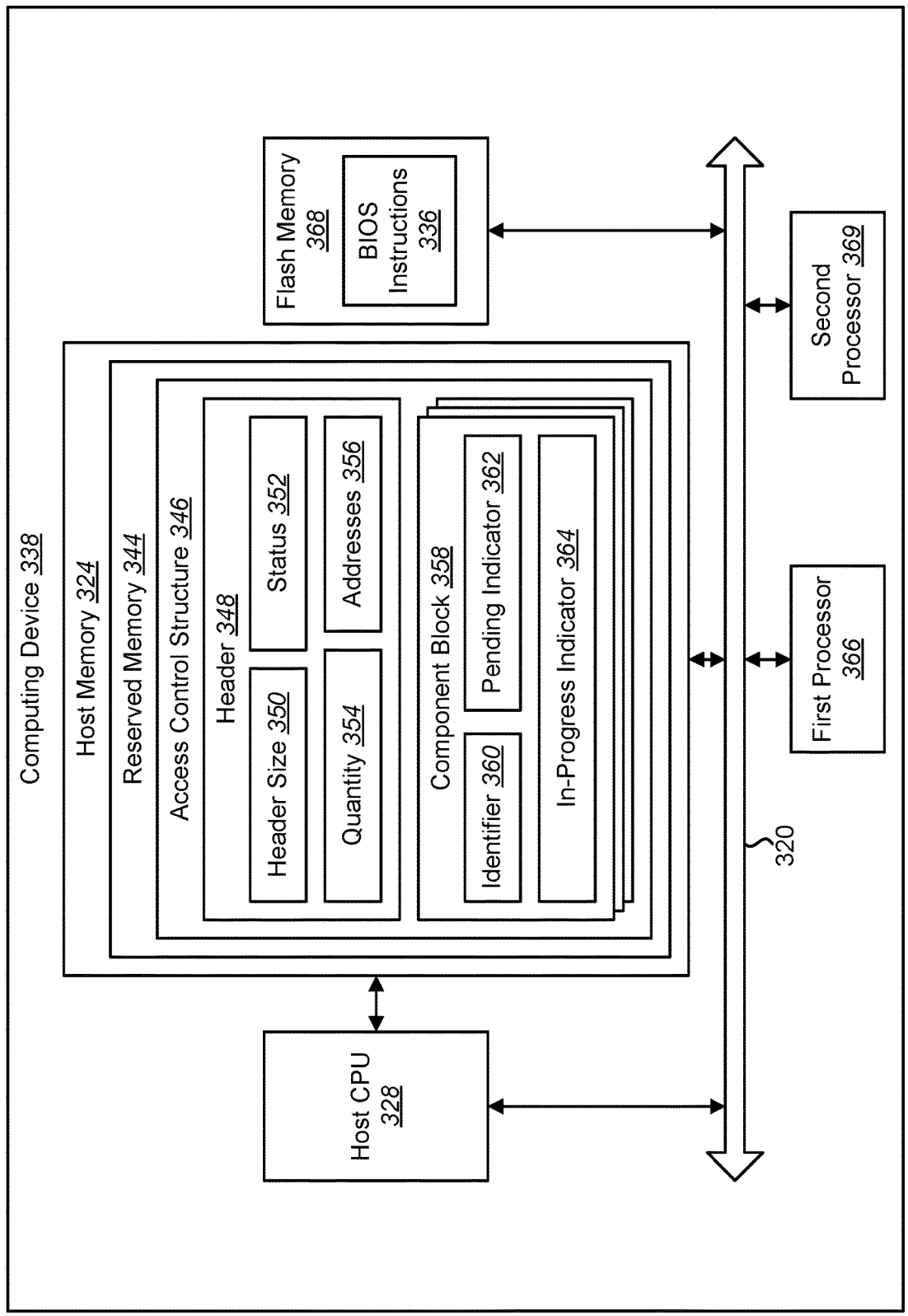
FIG. 3 is a block diagram illustrating an example of a computing device to control memory accesses.

FIG. 3 is a block diagram illustrating an example of a computing device 338 to control memory accesses. In some examples, the computing device 338 may perform the operations described in FIG. 1, FIG. 2, FIG. 4, or a combination thereof. The computing device 338 may be an example of the electronic device 202 described in FIG. 2. In some examples, the computing device 338 may include host CPU 328, a host memory 324, a flash memory 368, a bus 320, a first processor 366, and a second processor 369. Examples of the first processor 366 or the second processor 369 may include an embedded controller, a management engine, a network interface controller, etc. A management engine may be circuitry to perform management tasks, security-related tasks, or a combination thereof. In some examples, a management engine may be included in a platform controller hub.

In some examples, the first processor 366 may include or may have access to a first memory (not shown in FIG. 3) that is separate from the host memory 324 and the flash memory 368. For instance, the first processor 366 may execute instructions in the first memory to perform an operation or operations described herein. In some examples, the second processor 369 may include or may have access to a second memory (not shown in FIG. 3) that is separate from the host memory 324 and the flash memory 368. For instance, the second processor 369 may execute instructions in the second memory to perform an operation or operations described herein.

Examples of the computing device 338 may include a computing device, smartphone, laptop computer, tablet device, mobile device, etc. In some examples, one, some, or all of the components of the computing device 338 may be structured in hardware (e.g., circuitry). In some examples, the components described in FIG. 3 may be examples of corresponding components described in FIG. 1, FIG. 2, or a combination thereof. In some examples, the computing device 338 may perform one, some, or all of the operations described in FIG. 1-5.

In some examples, the first processor 366, and the second processor 369 may be coupled to the host memory 324 and to the flash memory 368 by the bus 320. Examples of the bus 320 may include an SPI bus, eSPI bus, inter-integrated circuit (I2C) bus, general purpose input/output (GPIO) bus, or a combination thereof, etc. The bus 320 may be utilized to communicate a signal, information, or a combination thereof. In some examples, the electronic device 202 may include a coupling(s) in addition to the bus 320. For instance, the host CPU 328 may be coupled to the host memory 324 independently of the bus 320.

In some examples, the flash memory 386 may include BIOS instructions 336. In some examples of FIG. 3, a "BIOS" may refer to the host CPU 328 executing the BIOS instructions 336 to perform an operation(s). In some examples, the host CPU 328 may initialize an access control structure 346 in the host memory 324. For instance, the host CPU 328 (e.g., BIOS) may write the access control structure 346 in reserved memory 344 of the host memory 324 via the bus 320. In some examples, the access control structure 346 may include a status 352, a component quantity 354, and a set of addresses 356 for component blocks. In some examples, the access control structure 346 may include a header 348. The header 348 may include a header size parameter 350, the status 352 (e.g., flag), the component quantity 354, and the set of addresses 356. In some examples, a component block 358 in the access control structure 346 may include a component identifier 360, a request pending indicator 362, and an in-progress indicator 364.

In some examples, the host CPU 328 (e.g., BIOS) may initially write the access control structure 346 to a reserved memory 344 portion (e.g., UEFI reserved portion) of the host memory 324. For instance, the host CPU 328 may write initial values for the header size parameter 350, status 352, component quantity 354, addresses 356, component identifiers, request pending indicators, in-progress indicators, or a combination thereof. In some examples, the host CPU 328 may execute instructions (e.g., firmware instructions, BIOS instructions 336) to write the initial values. For example, the status 352 may initially indicate a clear (e.g., available, not busy, etc.) status, the request pending indicator 362 may initially indicate no request pending for a component, and the in-progress indicator 364 may initially indicate no task in progress. In some examples, the component quantity 354 and corresponding identifiers may be defined by the host CPU 328 (e.g., BIOS). In some examples, the component quantity 354, the identifiers, or a combination thereof may be static through the life of the host CPU 328 (e.g., BIOS). In some examples, the component quantity 354, the identifiers, or a combination thereof may be based on the hardware available on the computing device 338. In the example of FIG. 3, the component quantity 354 may indicate four (e.g., "3") corresponding to the host CPU 328, the first processor 366, and the second processor 369. In some examples, more or fewer components may be utilized.

In some examples, the first processor 366 that is coupled to the host memory 324 and to the flash memory 368 may read the status 352 of the flash memory in the access control structure 346. In a case that the status 352 indicates a clear status, the first processor 366 may set the status 352 as busy and may access the flash memory 368. In some examples, the first processor 366 may set the in-progress indicator 364 to indicate that a command or task is in-progress for the first processor 366. In some examples, the first processor 366 may set a command quantity (e.g., a quantity of SPI blocks). For instance, the command quantity may be a variable utilized to track a quantity of commands to be executed by a component (e.g., the first processor 366). In some examples, a command quantity may be stored in memory (e.g., local memory, embedded memory, associated memory, dedicated memory, or a combination thereof) of each component. For instance, a command quantity of the first processor 366 may be stored in first processor memory (not shown in FIG. 3). In some examples, the first processor 366 may decrement the command quantity. For instance, when each command (e.g., task) is completed, the first processor 366 may decrement the command quantity. In some examples, the first processor 366 may set the status 352 as clear when the command quantity reaches zero (e.g., "0").

In a case that the status 352 indicates a busy status, the first processor 366 may suspend a task. In some examples, the first processor 366 may set the request pending indicator 362 to indicate that the first processor 366 has a request pending. In some examples, the first processor 366 may resume the task after a period. For instance, after the task is suspended for the period, if the status 352 indicates a clear status, the first processor 366 may continue the task.

Figure 4:
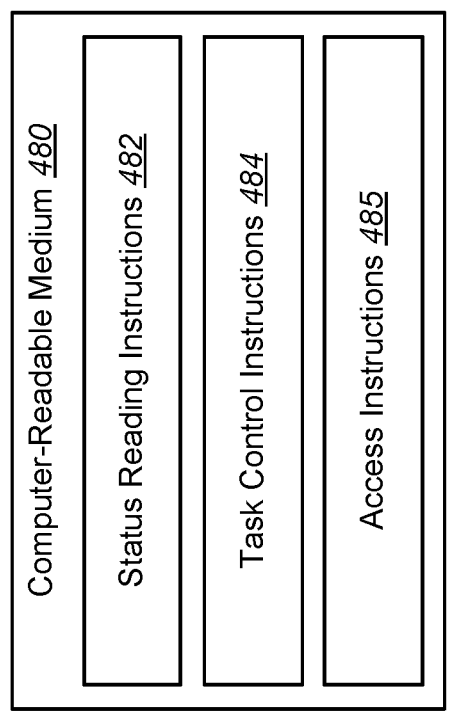
FIG. 4 is a block diagram illustrating an example of a computer-readable medium for memory accesses.

FIG. 4 is a block diagram illustrating an example of a computer-readable medium 480 for memory accesses. The computer-readable medium 480 is a non-transitory, tangible computer-readable medium. In some examples, the computer-readable medium 480 may be, for example, RAM, DRAM, EEPROM, MRAM, PCRAM, a storage device, an optical disc, the like, or a combination thereof. In some examples, the computer-readable medium 480 may be volatile memory, non-volatile memory, or a combination thereof. In some examples, the computer-readable medium 480 described in FIG. 4 may be an example of memory including instructions to be executed by a circuitry (e.g., logic circuit, processor, controller, engine, etc.) to access flash memory. For instance, the computer-readable medium 480 may be an example of the first memory or the second memory described in FIG. 3. In some examples, the computer-readable medium 480 may be separate from host memory and flash memory.

The computer-readable medium 480 may include data (e.g., information, instructions). In the example of FIG. 4, the computer-readable medium 480 includes status reading instructions 482, task control instructions 484, and access instructions 485.

The status reading instructions 482 may include instructions when executed cause a processor of an electronic device to read a status of a flash memory from an access control structure stored in host memory. In some examples, reading the status of the flash memory may be performed as described in FIG. 1, FIG. 2, FIG. 3, FIG. 5, or a combination thereof.

The task control instructions 484 may include instructions when executed cause the processor to suspend a task when the status indicates a busy status. In some examples, suspending the task may be performed as described in FIG. 1, FIG. 2, FIG. 3, FIG. 5, or a combination thereof. In some examples, the task control instructions 484 may include instructions when executed cause the processor to resume the task after a period. For instance, after the period, the status reading instructions 482 may be executed to read the status. After the period when the status indicates a clear status, the task control instructions 484 may be executed to set the status as busy, set a command quantity, or a combination thereof. For instance, the processor may set the status to busy and may set a command quantity.

The access instructions 485 may include instructions when executed cause a processor of an electronic device to access the flash memory. In some examples, accessing the flash memory may be performed as described in FIG. 1, FIG. 2, FIG. 3, FIG. 5, or a combination thereof. For instance, when the status indicates a clear status, the processor may execute the access instructions 485 to access the flash memory. In some examples, the task control instructions 484 may decrement the command quantity and may set the status as clear when the command quantity reaches zero.

Figure 5:
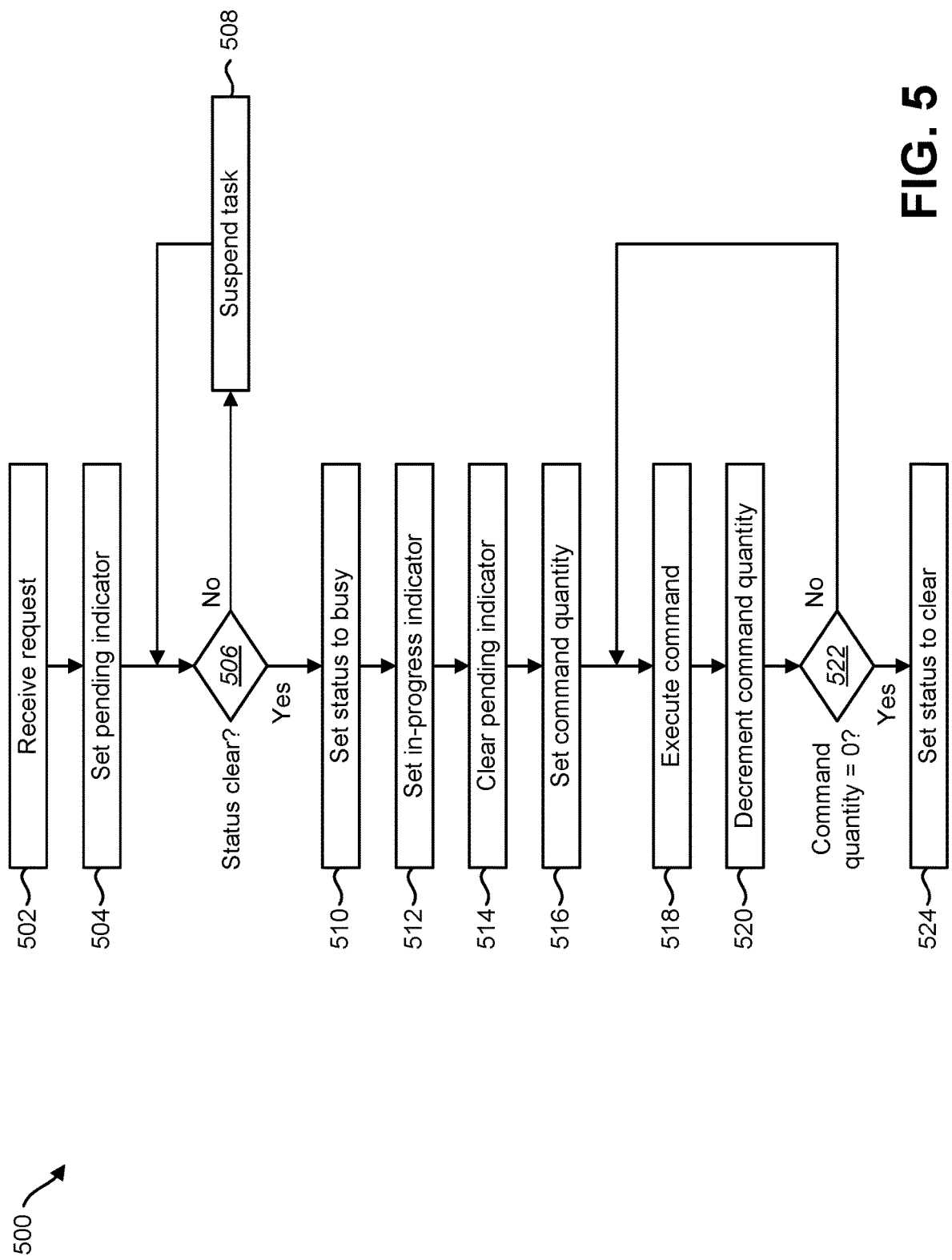
FIG. 5 is a flow diagram illustrating an example of a method for controlling memory access.

FIG. 5 is a flow diagram illustrating an example of a method 500 for controlling memory access. The method 500 or a method 500 element may be performed by an electronic device, computing device, or apparatus (e.g., electronic device 202, computing device 338, laptop computer, smartphone, tablet device, etc.). For example, the method 500 may be performed by the electronic device 202 described in FIG. 2 or the computing device 338 described in FIG. 3.

At 502, an electronic device may receive a request. For instance, a circuitry (e.g., logic circuit, processor, embedded controller, engine, etc.) may produce a request (e.g., command) to perform a task. In some examples, the request may include a suspension duration, a command quantity, or a combination thereof. The suspension duration may be a period (in milliseconds (ms) or seconds, etc., for instance) to suspend a task in a case that a status is busy. The command quantity may be a quantity of commands (e.g., SPI blocks) to be executed. For instance, the suspension duration, the command quantity (e.g., quantity of SPI blocks), or a combination thereof may be determined by each circuitry (e.g., stored in memory associated with each circuitry).

At 504, the electronic device may set a pending indicator. For example, the circuitry may write a request pending indicator to an access control structure in host memory. In some examples, setting the pending indicator may be performed as described in FIG. 3. For instance, the circuitry may use direct memory access to host memory over a bus to write the pending indicator, where the pending indicator indicates that a request is pending for the circuitry (in a component block, for instance).

At 506, the electronic device may determine whether a status is clear. For example, the circuitry may read the status from host memory, which may indicate whether the status is clear or busy. In some examples, determining whether the status is clear may be performed as described in FIG. 1, FIG. 2, FIG. 3, or FIG. 4. For instance, the circuitry may use direct memory access over a bus to read the status from the access control structure in host memory.

In a case that the status is not clear (e.g., the status is busy), the electronic device may suspend a task at 508. For instance, the circuitry may suspend the task (e.g., a thread) for the suspension duration. After the suspension duration, the circuitry may return to determining whether the status is clear at 506. In some examples, suspending the task may be performed as described in FIG. 1, FIG. 2, FIG. 3, or FIG. 4.

In a case that the status is clear (e.g., the status is available or not busy), the electronic device may set the status to busy at 510. For instance, the circuitry may use direct memory access to host memory over a bus to write the status as busy in the access control structure. In some examples, setting the status to busy may be performed as described in FIG. 1, FIG. 2, FIG. 3, or FIG. 4.

At 512, the electronic device may set an in-progress indicator. For instance, the circuitry may use direct memory access to host memory over a bus to write, in the access control structure, the in-progress indicator as indicating a task in progress. In some examples, setting the in-progress indicator may be performed as described in FIG. 2, FIG. 3, or FIG. 4.

At 514, the electronic device may clear a request pending indicator. For instance, the circuitry may use direct memory access to host memory over a bus to write, in the access control structure, the request pending indicator as indicating no pending request for the circuitry. In some examples, clearing the request pending indicator may be performed as described in FIG. 3 or FIG. 4.

At 516, the electronic device may set a command quantity. For instance, the circuitry may set a command quantity to an amount of commands pending for the circuitry. In some examples, setting the command quantity may be performed as described in FIG. 3 or FIG. 4.

At 518, the electronic device may execute a command. For instance, the circuitry may execute a command (e.g., access the flash memory, perform an SPI command, etc.). In some examples, executing the command may be performed as described in FIG. 3 or FIG. 4.

At 520, the electronic device may decrement a command quantity. For instance, the circuitry may subtract one from the command quantity. In some examples, decrementing the command quantity may be performed as described in FIG. 3 or FIG. 4.

At 522, the electronic device may determine whether a command quantity is zero. For instance, the circuitry may determine if the command quantity has decremented to zero. In some examples, determining whether the command quantity is zero may be performed as described in FIG. 3 or FIG. 4. In a case that the command quantity is not zero (e.g., is greater than zero), the electronic device may return to executing a next command at 518.

In a case that the command quantity is zero, the electronic device may set the status to clear at 524. For instance, the circuitry may use direct memory access to host memory over a bus to write, in the access control structure, the status as indicating a clear status. In some examples, clearing the status may be performed as described in FIG. 1, FIG. 2, FIG. 3, or FIG. 4. In some examples, the method 500 or an element or elements of the method 500 may be repeated. For instance, the method 500 may be performed for each of the circuitries to access the flash memory, a bus, or a combination thereof.

As used herein, items described with the term "or a combination thereof" may mean an item or items. For example, the phrase "A, B, C, or a combination thereof" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operation(s), function(s), aspect(s), or element(s) of the examples described herein may be omitted or combined.

What is claimed is:

1. An electronic device, comprising:
   a flash memory;
   a host memory to store an access control structure to access the flash memory; and
   a first circuitry coupled to the host memory and the flash memory, wherein the first circuitry is to read a status of the flash memory in the access control structure in the host memory to determine when to access the flash memory, and
   wherein the access control structure comprises the status, a component quantity, and a set of addresses for component blocks.

2. The electronic device of claim 1, wherein the first circuitry is to read the access control structure in the host memory via direct memory access.

3. The electronic device of claim 1, wherein the first circuitry is to read a status in the access control structure to determine when to access the flash memory.

4. The electronic device of claim 3, wherein the first circuitry is to:
   set the status as busy in response to a determination that the status is clear; and
   access the flash memory.

5. The electronic device of claim 3, wherein the first circuitry is to:
   suspend a task in response to a determination that the status is busy; and
   resume the task after a period.

6. The electronic device of claim 5, wherein the status was set to busy by a second circuitry included in the electronic device.

7. The electronic device of claim 1, further comprising a basic input/output system (BIOS) to initialize the access control structure in the host memory.

8. The electronic device of claim 7, wherein the BIOS is to send an address indication to the first circuitry.

9. The electronic device of claim 1, further comprising a serial peripheral interface bus, wherein the first circuitry is to read the host memory and to access the flash memory via the serial peripheral interface bus.

10. A computing device, comprising:
- a host memory;
- a basic input/output system (BIOS) to initialize an access control structure in the host memory;
- a flash memory; and
- a processor coupled to the host memory and to the flash memory, wherein the processor is to read a status of the flash memory in the access control structure,
- wherein the access control structure comprises the status, a component quantity, and a set of addresses for component blocks.

11. The computing device of claim 10, wherein a component block in the access control structure comprises a component identifier, a request pending indicator, and an in-progress indicator.

12. A non-transitory tangible computer-readable medium comprising instructions when executed cause a processor of an electronic device to:
- read a status of a flash memory from an access control structure stored in host memory;
- suspend a task when the status indicates a busy status;
- resume the task after a period; and
- after the period when the status indicates a clear status,
  - set the status as busy;
  - set a command quantity;
  - access the flash memory;
  - decrement the command quantity; and
  - set the status as clear when the command quantity reaches zero.

* * * * *